US008150802B2

(12) United States Patent
Ramasubramanian et al.

(10) Patent No.: US 8,150,802 B2
(45) Date of Patent: Apr. 3, 2012

(54) ACCUMULATING STAR KNOWLEDGE IN REPLICATED DATA PROTOCOL

(75) Inventors: Venugopalan Ramasubramanian, Mountain View, CA (US); Thomas L. Rodeheffer, Mountain View, CA (US); Douglas B. Terry, San Carlos, CA (US); Meg Walraed-Sullivan, San Diego, CA (US); Edward P. Wobber, Menlo Park, CA (US)

(73) Assignee: Microsoft Corporation, Redmond, WA (US)

( * ) Notice: Subject to any disclaimer, the term of this patent is extended or adjusted under 35 U.S.C. 154(b) by 439 days.

(21) Appl. No.: 12/053,632

(22) Filed: Mar. 24, 2008

(65) Prior Publication Data

US 2009/0240719 A1 Sep. 24, 2009

(51) Int. Cl.
*G06F 7/00* (2006.01)
*G06F 17/00* (2006.01)
(52) U.S. Cl. ........................................ 707/610; 707/661
(58) Field of Classification Search .................. 707/661, 707/610
See application file for complete search history.

(56) References Cited

U.S. PATENT DOCUMENTS

| | | | |
|---|---|---|---|
| 5,806,075 A | 9/1998 | Jain et al. | |
| 6,049,809 A | 4/2000 | Raman et al. | |
| 6,138,124 A | 10/2000 | Beckhardt | |
| 6,301,589 B1 | 10/2001 | Hirashima et al. | |
| 6,446,092 B1 * | 9/2002 | Sutter | 1/1 |
| 6,505,200 B1 | 1/2003 | Ims et al. | |
| 6,757,896 B1 | 6/2004 | Cohen et al. | |
| 7,149,761 B2 | 12/2006 | Cooke et al. | |
| 2004/0044702 A1 * | 3/2004 | Ferreira Alves et al. | 707/203 |
| 2006/0155778 A1 | 7/2006 | Sharma et al. | |
| 2006/0190572 A1 * | 8/2006 | Novik et al. | 709/220 |

OTHER PUBLICATIONS

Mathiason, et al., "Virtual Full Replication by Static Segmentation for Multiple Properties of Data Objects", 2005, pp. 1-8.
Düllmann, et al., "Models for Replica Synchronisation and Consistency in a Data Grid", High Performance Distributed Computing, 2001, Proceedings, 10th IEEE International Symposium on Publication Date: 2001, pp. 67-75.
Abawajy, et al., "A Novel Data Replication and Management Protocol for Mobile Computing Systems", Abstract, vol. 1, No. 1/2006, p. 1.
Chang et al., "Adaptable Replica Consistency Service for Data Grids", Proceedings of the Third International Conference on Information Technology: New Generations (ITNG'06), pp. 646-651.

* cited by examiner

*Primary Examiner* — Charles Lu
(74) *Attorney, Agent, or Firm* — Microsoft Corporation

(57) ABSTRACT

A distributed system includes full and partial replicas of a set of data items that may be inserted, modified, or deleted by any replica. Replicas may occasionally synchronize with other arbitrarily chosen replicas to learn about updates. A replica's knowledge includes one or more knowledge fragments, where each fragment indicates a set of items. A type of knowledge fragment, called a star knowledge fragment, contains versions associated with all items in the system. Star knowledge fragments are compact because the set of items stored at a replica need not be explicitly listed. Once all replicas know of all updates in the system, partial and full replicas will have the same compact star knowledge fragment.

10 Claims, 6 Drawing Sheets

ACCUMULATING STAR KNOWLEDGE IN REPLICATED DATA PROTOCOL

BACKGROUND

A system may include a collection of computing devices, where a data item may be multiply replicated to create a number of copies of the item on the different computing devices and/or possibly within a single device. An item may be any stored data object, such as for example contact or calendar information, stored pictures or music files, software application programs, files or routines, etc. The collection of computing devices may for example be a desktop computer, a remote central server, a personal digital assistant (PDA), a cellular telephone, etc. The group of all such items and replicas where the items are stored may be referred to as a distributed collection.

Replication, or synchronization, of data is one process used to ensure that each data store has the same information. Synchronization protocols are used by devices that exchange created and updated versions of items in order to bring themselves into a mutually consistent state. The periodicity of the synchronization may vary greatly. Networked devices may synchronize with each other frequently, such as once every minute, hour, day, etc. Alternatively, devices may synchronize infrequently, such as for example where a portable computing device is remote and disconnected from a network for a longer period of time. Whether the synchronization is frequent or infrequent, the distributed collection is said to be weakly-consistent in that, in any given instant, devices may have differing views of the collection of items because items updated at one device may not yet be known to other devices.

Synchronization between replicas may be described as a sharing of knowledge between replicas. A common synchronization scheme involves tracking, within each replica, changes that have occurred to one or more items subsequent to a previous synchronization. One such tracking scheme makes use of version vectors, which consist of a list of version numbers, one per replica, where each version number is an increasing count of updates made to an item by a replica. Another synchronization scheme, implemented for example in the Sync Framework from Microsoft Corp., makes use of knowledge vectors. Unlike version vectors, knowledge vectors are associated with the replicas rather than the items. Each replica keeps a count of the updates it generates, and the knowledge vector of a replica consists of the version number of the latest update it learned from every other replica. In addition, each item at a replica has a single version number indicating the latest update applied to it.

While knowledge vectors work well for total replication between replicas, it may happen that one or more replicas are only interested in receiving a certain subset of information. This situation is referred to as partial replication. In order to allow for partial replication, a replica may contain a filter. A "filter" may be broadly defined as any construct that serves to identify a particular set of items in a data collection. These items are said to fall within the partial replica's "interest set."

During synchronization, a target replica sends its knowledge, in the form of one or more knowledge vectors, to a source replica. The source replica then returns any versions of items stored in its local database that are not known to the target replica, i.e., items with versions that are not already included in the target's knowledge. The source also returns its own knowledge as learned knowledge in most cases. Synchronization protocols may rely on learned knowledge to help replicas maintain concise, defragmented knowledge.

During synchronizations, the learned knowledge sent from the source replica to the target replica may include versions of items that: (a) were known to the target prior to synchronization, (b) were sent during this synchronization session, (c) are not of interest to the target, i.e. do not match the target's filter, or (d) are obsolete, such as versions that causally precede any versions in category (a), (b), or (c). If the source is a partial replica whose filter does not dominate the target's filter, then the source's knowledge may include versions that do not match any of these four criteria for learned knowledge. Thus, the source replica may send learned knowledge about a subset of the items that it holds, which may cause the target replica to end up with multiple knowledge fragments, i.e. with knowledge vectors associated with different subsets of items, even if the target replica contained a single knowledge vector before synchronization occurred.

SUMMARY

A distributed system synchronizes a set of replicas interested in a set of objects that may be inserted, modified, or deleted by any replicas. Replicas may occasionally synchronize with other arbitrarily chosen replicas to learn about updates. A replica's knowledge includes one or more knowledge fragments, where each fragment indicates a set of items. A type of knowledge fragment, called a star knowledge fragment, contains versions associated with all items in the system. Star knowledge fragments are compact because the set of items stored at a replica need not be explicitly listed. Once all replicas know of all updates in the system, partial and full replicas will have the same compact star knowledge fragment.

In some implementations, a method of synchronizing replicas in a system in which a collection of items are replicated fully or partially at two or more replicas may include recording item-set knowledge of which each replica is aware at each replica; sending the item-set knowledge from a target replica to a source replica; receiving unknown items and learned knowledge from the source replica at the target replica; adding the unknown items and the learned knowledge to the target replica's item-set knowledge; informing the target replica of versions for which the source replica is authoritative; and constructing star knowledge at the target replica from authoritative information from the source replica.

This summary is provided to introduce a selection of concepts in a simplified form that are further described below in the detailed description. This summary is not intended to identify key features or essential features of the claimed subject matter, nor is it intended to be used to limit the scope of the claimed subject matter.

BRIEF DESCRIPTION OF THE DRAWINGS

The foregoing summary, as well as the following detailed description of illustrative embodiments, is better understood when read in conjunction with the appended drawings. For the purpose of illustrating the embodiments, there are shown in the drawings example constructions of the embodiments; however, the embodiments are not limited to the specific methods and instrumentalities disclosed. In the drawings.

DETAILED DESCRIPTION

Implementations will now be described with reference to FIGS. 1-7, which in general relate to synchronization in partial-replication systems. As will be described below, there are instances during synchronizations where the source replica's knowledge may include versions of items that are not of interest to the source, but may be of interest and unknown to the target replica. Therefore, the source cannot simply send all of its current knowledge as learned knowledge. This means that even if both the source and target have star knowledge, as described below, the target replica may end up with non-star knowledge when the synchronization process successfully completes. Thus, implementations are described that provide for synchronization processes where full and partial replicas converge to a state where they all have a single star knowledge fragment. In other words, once all replicas know of all updates, all replicas, both full and partial, should have the same compact knowledge.

Figure 1:
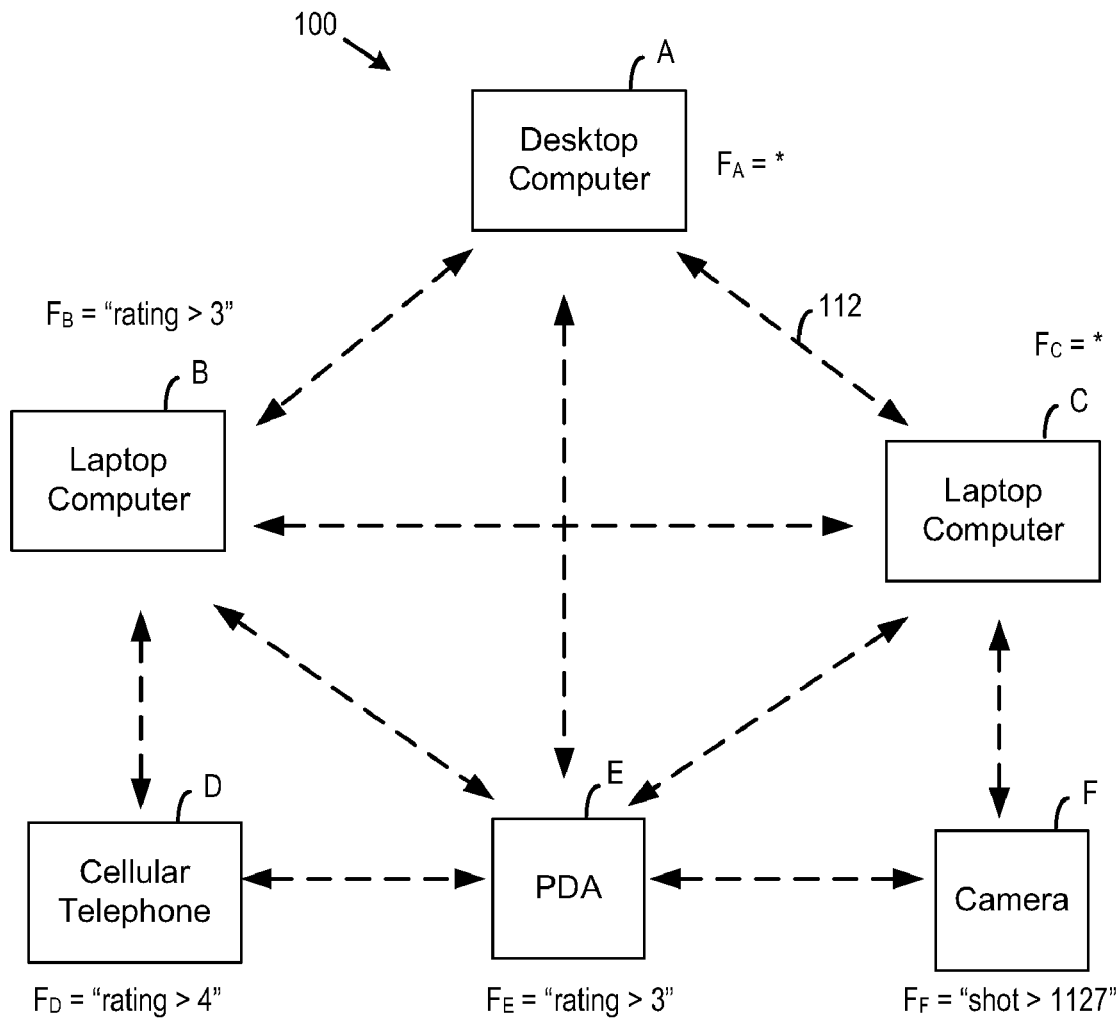
FIG. 1 is a diagram of a weakly-consistent distributed collection including one or more partial replicas according to implementations of the present system.
Figure 2:
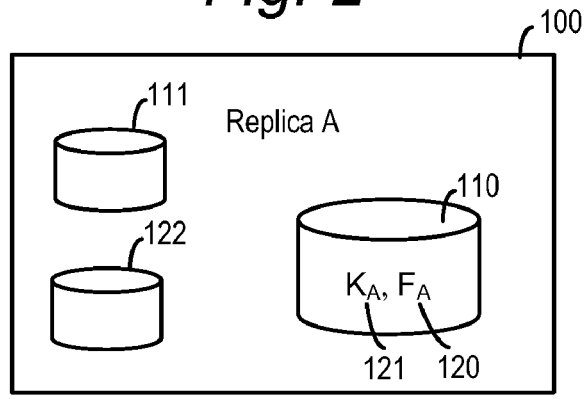
FIG. 2 shows a replica including data store, push-out store, knowledge, filter, and hierarchy information according to implementations of the present system.

Referring initially to FIGS. 1 and 2, the system includes a plurality of replicas 100a-f, arbitrarily referred to herein as replicas A through F. The designation replica 100 is used when discussing a replica in general without regard to which particular one it might be, and likewise for other components. Each replica 100 may create and/or modify a version of an item in a collection. A replica may be a computing system environment. However, multiple replicas may exist on a single computing system environment, and a single replica may exist across multiple computing system environments. Each replica 100 may include a data store 110 associated with a processor on one or more computing system environments described herein or as known in the art. Each data store 110 may store data associated with items in the collection. Each replica 100 may include a push-out store 111 associated with a processor on one or more computing system environments described herein or as known in the art. Each replica 100 may include knowledge 121 indicating which versions of items the replica is aware of. Each replica 100 may additionally include a filter 120 to define a subset of items the replica is interested in receiving and retaining in its data store. Each replica 100 may additionally include hierarchical information 122 about the location of the replica 100 in a hierarchical synchronization topology. Details about the push-out store 111 and hierarchical information 122 will be provided hereinafter. The processor can create a new item, modify an item to produce a new version, place versions into the data store 110 and discard versions from the data store 110. The processor can also place versions into the push-out store 111, discard versions from the push-out store 111, and transfer versions between the data store 110 and the push-out store 111. An alternative implementation could employ one store for both the data store 110 and the push-out store 111 by associating with each version an indication of whether the version belonged in the data store 110 or in the push-out store 111.

In FIG. 1, the replicas 100 may include a desktop computer A, a pair of laptop computers B and C, a cellular telephone D, a personal digital assistant (PDA) E and a digital camera F. The number and type of replicas comprising the collection shown in the figures is by way of example and there may be greater, fewer or different replicas in the collection than is shown. Moreover, the total membership of the collection does not necessarily need to be known to any given replica at any given time. Each replica in the synchronization community has a unique ID, which may be a global unique identifier (GUID) in one implementation.

Each replica 100 is shown with a corresponding filter 120 that specifies the interest set of the replica. In FIG. 1, these filters are illustrated as based on certain example attributes of a photo in a photo collection. In this example, camera F takes photos, assigning a "camera shot number" to each photo. Since the user wants his recent pictures to be available on the camera, the camera may have a filter specifying that it is interested in all camera shots after a particular number. Another example attribute may be a user-assigned subjective "rating" of 1 to 5 stars. The number and type of the attributes and the filters is by way of example and there may be greater, fewer, or different attributes and filters in the collection than is shown. For example, perhaps cell phone D could also take photos.

The replicas may communicate with each other in an ad hoc, peer-to-peer network via communication links 112 (represented by dashed lines) between the various replicas. It may be that not all replicas are linked to all other replicas. For example, laptop B is linked to desktop A, laptop C, cellular phone D, PDA E, but not digital camera F. Consequently, laptop B can synchronize with digital camera F only through one or more intermediate synchronization steps with replicas A and C through E. The illustrated communication links can be wired and/or wireless links, and may or may not include the Internet, a LAN, a WLAN or any of a variety of other networks.

Figure 3:
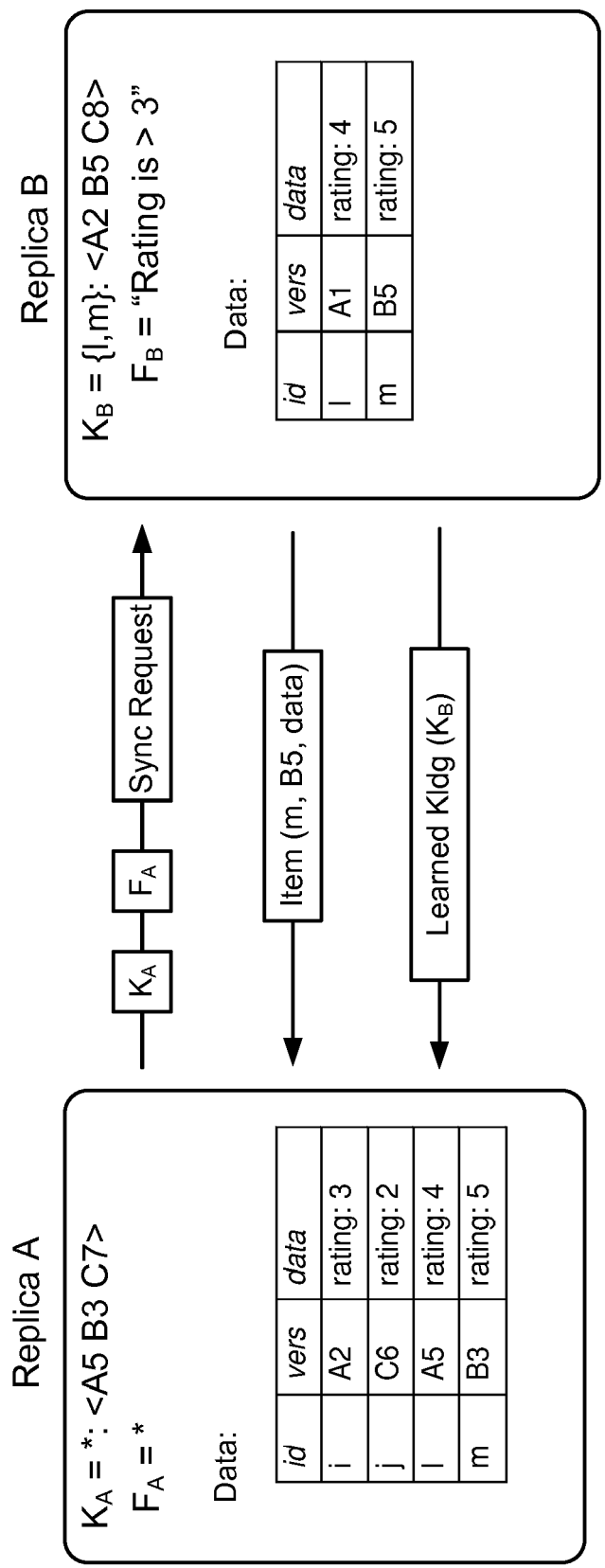
FIG. 3 shows an implementation of a one-way synchronization operation between a pair of replicas.

Referring now to FIG. 3, there is shown an example of replication between two replicas using a filter. The example shown in FIG. 3 is a one-way synchronization. Namely, there is an initiating replica requesting the synchronization (in this example, first replica A), and a source replica which is contacted to provide updated information (in this example, second replica B). In this example, replica B determines updated items replica A is not aware of, and transmits those updated items to replica A. From the point of view of transmitting items, replica B is the sending replica and replica A is the receiving replica.

While the figures and the description indicate a particular order of execution, the operations and/or their order may vary in alternative implementations. For example, a pair of replicas could synchronize one-way, exchange roles, and synchronize the other way, thus performing a two-way synchronization. Furthermore, in some implementations, some or all of the operations may be combined or executed contemporaneously. In the example of FIG. 3, replica A includes knowledge $K_A$ and a set of data items. Similarly, replica B includes knowledge $K_B$ and a set of items.

In accordance with an implementation, the concept of item-set knowledge, as described herein, may be used to synchronize partial replicas with low synchronization overhead. Partial replicas are those in which a "filter" may be specified or provided during a synchronization request. A filter is any construct that serves to identify a particular set of items of local interest to a replica and which get stored in a replica's data store. A filter may select items from the data collection based on their contents or metadata. In an implementation, a filter may be a SQL query over tabular data or an XPath expression over XML representations of items or any other type of content-based predicate.

An item may fall within a filter at one time, but due to a subsequent change in the item, may fall outside the filter at another time. As an example, consider partial replica B in FIG. 1, which has a filter that selects "all photos having a rating of three or more stars". In this example, when using a replica in the collection, a user may ascribe a photo a rating of three stars. Thus, upon synchronization, replica B would accept this photo. However, subsequently, the user or another authorized user may downgrade the rating of the photo to two stars. At that time, replica B would want to learn that the downgraded photo was no longer of interest and it would not be interested in further updates, unless the photo was again upgraded to three stars or more.

In some implementations, the filter itself may be transmitted as part of the synchronization request. In other implementations, the filter may be stored elsewhere and only some means of identifying the filter may be transmitted as part of the synchronization request. In yet other implementations, certain types of synchronization requests may automatically result in the use of certain filters, in which case the filter itself may not be transmitted with the synchronization request. For example, a synchronization request transmitted over a low bandwidth connection might automatically result in the use of a filter that in some way reduces the number or nature of the items or changes returned.

Item-set knowledge associates knowledge vectors with subsets of items in a collection, instead of with the whole collection. Item-set knowledge represents an intermediate position between the two extreme cases of per-item version vectors and a single knowledge vector per replica in terms of space and bandwidth consumption. In the best case, the item-set knowledge may just require one fragment to cover the knowledge of all the items in the replica, while in the worst case, it may require a separate fragment for each item in the replica.

Each replica's knowledge is a set of knowledge fragments. Each knowledge fragment consists of two parts: an explicit set of items (indicated by their GUIDs) and an associated set of versions represented by a knowledge vector. In addition, the latest version number for each item needs to be maintained separately by the replica. The semantics are that, for any item in the item-set, the replica is aware of any versions included in the associated knowledge vector. Knowledge fragments are additive, i.e. a replica knows about a specific version of a specific item if any of its knowledge fragments includes the item in the item-set and the version in the associated knowledge vector. A knowledge vector may include versions for items that are not in the associated item-set, in which case nothing may be concluded about these versions.

A knowledge fragment may refer to the universal set of all items without needing to list all possible GUIDs. Such a knowledge fragment is called "star knowledge." Having star knowledge means that the replica is aware of all updates performed by each listed replica up to the corresponding version number in the knowledge vector.

A replica holds knowledge about items that it currently stores. This first type of knowledge is called "class I knowledge." In addition, a partial replica may be aware of items that it does not store because the current version of the item is outside its scope of interest. This second type of knowledge is called "class II knowledge." Further details relating to class II knowledge are set forth hereinafter. As an alternative implementation, a partial replica may store a "place holder" to represent an item that is outside its scope of interest. In this alternative implementation, knowledge of place holders corresponds to class II knowledge.

A replica initiating synchronization sends all of its knowledge fragments (both class I and class II) to the source replica, which returns, in addition to updated items, one or more knowledge fragments as learned knowledge.

When an item is created with a new version generated by the creating replica, this version is added to the replica's class I knowledge. If the replica has a single class I knowledge fragment, the process is straightforward. The new item's ID is added to the knowledge fragment's item-set and the new version is added to the fragment's knowledge vector. If the replica has multiple class I knowledge fragments, then several options are possible. One option is to create a new knowledge fragment for the new item. This may result in many small knowledge fragments. An alternative is to add the new item and version to all of the knowledge fragments. A still further alternative is to choose one knowledge fragment to which the new item is added. The fragment that is selected may be the one that has the largest item-set or the fragment with the maximal knowledge.

When an item is updated locally, the new version number is added to the knowledge vector of the knowledge fragment that includes the item in its item-set. Optionally, it could be added to all knowledge fragments. A partial replica can choose to discard any item that it stores. For example, a partial replica will generally discard items that are updated and no longer match its filter. In such a case, the ID of the discarded item could be removed from the item-set of the class I knowledge fragment(s) that contain this item. If the item-set is empty, i.e. it only contained this single item, then the whole knowledge fragment may be discarded. If the version of the removed item does not match the partial replica's filter, it may be retained as class II knowledge.

Replicas may change their filters. If a partial replica modifies its filter, i.e. changes the predicate that selects items of local interest, then in the general case it discards all of its class II knowledge, because it has no way of knowing whether those items match its new filter or not. However, if the new filter is more restrictive than the old filter, meaning that all items excluded by the old filter are also excluded by the new filter, then the class II knowledge is still valid and need not be discarded.

At the end of a synchronization session, the sending replica transmits as learned knowledge all of its knowledge fragments. However, items that may match the filter predicate provided by the receiving replica but are not stored by the sending replica are removed from the item-sets of the learned knowledge fragments. In practice, this means that class II knowledge will not be returned as learned knowledge unless the sending replica is a full replica or is a partial replica whose filter matches anything that would be selected by the receiving replica's filter. Learned knowledge fragments that are received at the completion of a synchronization session are added to the receiving replica's knowledge. Redundant fragments can be discarded as discussed below.

Thus, referring now to FIG. 3, there is shown a replica A requesting a synchronization with a replica B. Each replica has a knowledge fragment S:K, where S is an explicit set of items or "*" for all items, indicating star knowledge. K is a knowledge vector. A knowledge fragment for a given replica, S:K, indicates that the given replica has knowledge about all versions in K for all items in S. Replica A is a full replica; that is, has no filter, with knowledge consisting of a single knowledge fragment:

$$K_A = *: <A5B3C7>$$

representing knowledge about items i, j, l and m having various associated ratings 2 through 5. Furthermore, since this is star knowledge, replica A knows that no other items were created or updated by any of the replicas A, B, and C up to the corresponding version numbers 5, 3, and 7.

In the example of FIG. 3, replica B has a filter relating to the rating of items. In particular, replica B accepts items having a rating of >3. The items may relate to anything capable of being rated, such as for example data relating to movies, books, videos, etc. Replica B has a knowledge fragment:

$$K_B = \{l, m\}: <A2B5C8>$$

representing knowledge about items I and m which have ratings >3.

Figure 4:
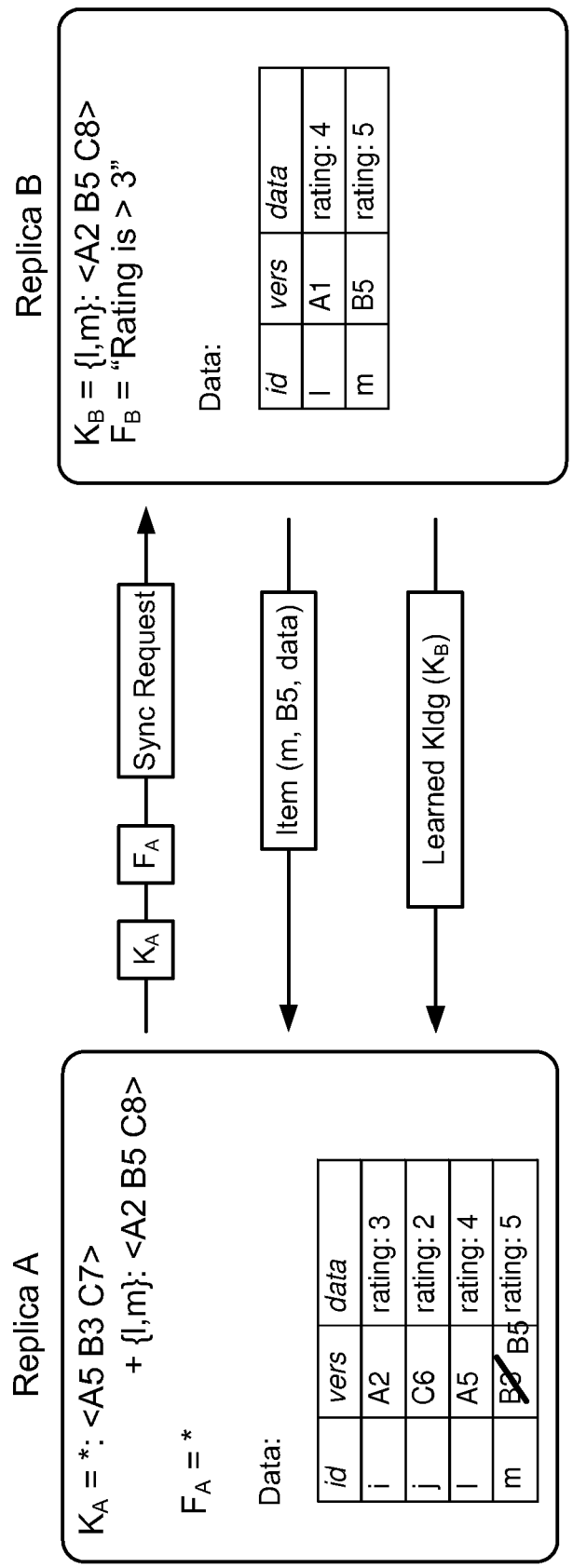
FIG. 4 shows the replicas of FIG. 3 after the one-way synchronization operation.

Upon requesting the synchronization, replica A sends its knowledge $K_A$ and its filter $F_A$. Replica B learns that replica A is unaware of version B5 and determines that the item with this version matches replica A's filter. Therefore, replica B returns version B5 and associated data to replica A. As shown in FIG. 4, the version B3 in replica A is updated to B5. In the process of adding version B5 to its data store, replica A may detect an update conflict using known techniques for conflict detection. Known conflict resolution techniques may be applied in cases where an update conflict is detected.

Lastly, replica B returns the learned knowledge $K_B$. That is, as shown in FIG. 4, replica A learns about versions in $K_B$ for items l and m. Thus after the synchronization, as shown in FIG. 4, replica A has two knowledge fragments:

$$K_A = *: <A5B3C7> + \{l, m\}: <A2B5C8>.$$

This process may be repeated for each synchronization between replicas within the collection. In this example, replica B returned its complete knowledge as learned knowledge. However, in general, a replica should only return learned knowledge for items it stores that match the requesting replica's filter or for versions of items that it knows do not match the filter.

As indicated above, replicas with knowledge of all items are said to have "star knowledge." Conceptually, star knowledge is just an item set knowledge fragment $U:K_U$ that covers the universal set U of items in the system; the set of items is implicit in the definition and need not be stored or communicated explicitly. Full replicas may represent their knowledge as a single star knowledge fragment, which avoids the need to explicitly list all of the items in the replicated data collection. Partial replicas can also use star knowledge in some cases.

A method for accumulating star knowledge in a replication system is as follows: each replica speaks for itself in terms of star knowledge, that is, the latest version number issued by a replica represents the star knowledge component for that replica. A replica can accumulate star knowledge components for other replicas by individually synchronizing with every other replica and learning their most recent version numbers. This assumes that replicas do not discard items they created or changed.

Some implementations relate to a hierarchical approach to perform synchronization that provides guaranteed paths of information to all replicas in a collection. According to such an implementation, each partial replica is assigned a preferred replica to act as a proxy on its behalf. This preferred replica is called the replica's "parent." The partial replica regularly synchronizes with its parent as both source and target. The partial replica is said to be a "child" of its parent.

Parent replicas have filters that are either the same as, or more inclusive than, their children, and parent replicas thus store and synchronize all objects that are of interest to their one or more children replicas. Replicas avoid cyclic parent relationships by ensuring that they are not assigned one of their descendents as a parent. Full replicas that are interested in all items, also called reference replicas, are not required to pick parent replicas, although they form a connected synchronization topology between them. A "descendant" of a replica is any replica that is either (a) a child of that replica or (b) a descendant of a child of that replica. Likewise, an "ancestor" of a replica is a parent or an ancestor of a parent.

Referring to FIG. 2, information about a replica's location in the hierarchy is maintained in the replica's hierarchical information 122. Such information may include identification of parent replicas, identification of child replicas, identification of ancestor replicas, identification of descendant replicas, and the length of a chain of parents required to reach a reference replica.

Figure 5:
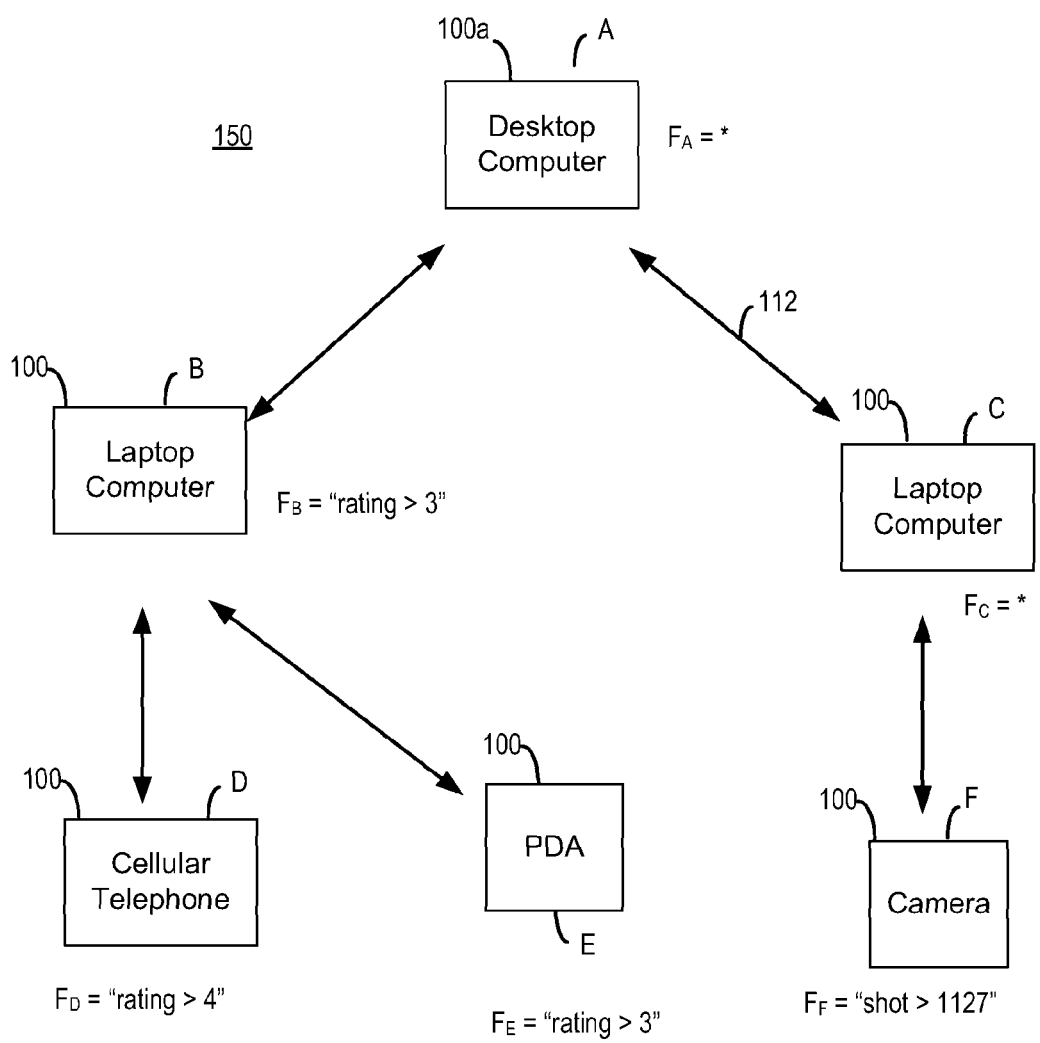
FIG. 5 shows an implementation of a tree structure hierarchical synchronization topology of replicas.

Referring now to FIG. 5, there is shown a hierarchical synchronization topology 150 for the example weakly consistent distributed collection of FIG. 1. The topology 150 includes a plurality of replicas 100 arranged in a hierarchy where each replica includes a parent except for a reference replica 100a, explained in greater detail hereinafter. As shown, a given replica, such as replica C, may be both a parent replica (to replica F) and a child replica (to the reference replica A). A parent replica has a filter that is equal to or greater than its child replicas. As used herein, a filter indicates the items which are included in an interest set of a replica, as opposed to the filter indicating which items are excluded. In the topology 150 of FIG. 5, replica B having an interest set of items with "rating >3" is the parent of replicas D and E, which have interest sets of items with "rating >4" and "rating >3", respectively. Reference replica A has an interest set of all items and is in turn the parent of replicas B and C.

At the top of the hierarchical topology are one or more reference replicas, such as replica A in FIG. 5. Reference replicas are complete replicas that are interested in all items in the collection. Partial replicas may create new items, which items work their way up the hierarchical topology through synchronization operations until a reference replica has a copy of the item, whereupon the item is disseminated to all reference replicas and then possibly down the hierarchical topology to any partial replica that is interested in the item. In order to ensure that each item is replicated throughout the weakly-consistent collection to all replicas that are interested in it, partial replicas synchronize with a reference replica, either directly, or as a descendent of a replica that has synchronized with a reference replica.

The hierarchical synchronization according to implementations of the present system ensures two properties of a replicated system: all replicas accumulate knowledge of items of interest and replicas are able to disseminate items to other replicas. Through a path of synchronizations between replicas organized in a hierarchy, a picture with rating >4 taken by camera F in FIG. 5 is guaranteed to be seen by cell phone D, and more generally, all items in a collection are guaranteed to be passed to replicas having an interest in such items.

New and updated items are propagated (and knowledge of such items is accumulated) up the hierarchical topology to a reference replica as a result of synchronization operations occurring between child and parent replicas in the hierarchy. Thus, in the example of FIG. 5, assume that replica E creates a new item, such as for example a photo with rating 4. At some time $t_1$, the parent replica B requests a synchronization with its child replica E, following the synchronization operation described above. According to the hierarchical rules, replica B will be interested in anything within replica E's interest set.

During that synchronization operation, replica B learns of the new item, updates its data store with the new item and updates its knowledge to reflect that it has received this item.

At some later time $t_2$, the reference replica A requests a synchronization with its child replica B. As a reference replica, replica A is interested in every item. During that synchronization operation, reference replica A learns of the new item, updates its data store with the new item and updates its knowledge to reflect this new item. The example of FIG. 5 includes only one intermediate parent between a lowest level (most restrictive filter) replica and a top-level reference replica. However, it is understood that any number of levels of parents may exist between a lowest level replica and a reference replica, and that information will be accumulated in a reference replica by each replica in a hierarchical chain passing items upward to its parent.

By defining a hierarchical topology of one or more children synchronizing with one or more parents as described above, it is guaranteed that all items created by any replica in the collection will eventually be assimilated into a reference replica. Once the hierarchical relationships are defined, synchronization of the parents to and from their one or more child replicas to pass new or updated items may occur by ad hoc synchronization; that is, by normal synchronization operations of parents to their children that occur at times but according to no set schedule. However, in an alternative implementation, synchronization of one or more children to and from their parent replica may be forced periodically according to a set schedule. The periodicity of this schedule may vary in alternative implementations. In some implementations, replicas may be allowed to synchronize with other replicas that are neither their parent nor child, that is, arbitrary synchronization patterns are permitted in addition to those suggested by the hierarchical topology.

In implementations of the hierarchical synchronization system, it may happen that an item is created by or modified within a partial replica so that it is outside of the interest set of the replica. This is called a "push-out." Even though the partial replica is not interested in the new or updated item, since it holds the only copy it must keep it until it can guarantee that the item will eventually reach a reference replica. The replica can address this problem by maintaining that item in a "push-out" store that is managed independently from its data store. FIG. 2 shows a replica 100 with a push-out store 111. The purpose of the push-out store is to hold onto an item until the replica is assured that some other replica has assumed responsibility for the item. When an item is discarded from its push-out store, the replica may add the item to its class II knowledge.

The description hereinafter uses the following definitions. A replica "stores" a version of an item if either (a) the version is in the replica's data store, (b) the version is in the replica's push-out store, or (c) the version is superseded by a version that the replica "stores". A replica "knows" a version of an item if either (a) the replica "stores" the version, (b) the replica is assured that the version falls outside the replica's filter, or (c) the version is superseded by a version that the replica "knows". Roughly, versions that a replica "stores" are included in its class I knowledge and versions that a replica "knows" are included in its class I or class II knowledge.

In implementations, a replica may include items in its push-out store in its class I knowledge, since they are items that it "stores". Alternatively, a replica may include items in its push-out store in its class II knowledge, as items that it knows about but that fall outside its interest set.

In an implementation, when a parent requests a synchronization from its child, the child replica sends push-out notifications of items in its push-out store to the parent replica and in this manner transfers responsibility for the items to its parent. The push-out notification transfers the item regardless of whether or not it falls within the parent's interest set. If such a transferred item is outside of the parent's interest set, the parent likewise maintains the item in its own push-out store until it is able to transfer the item to its parent. Alternatively, push-out notifications could be sent from child to parent when the child initiates a synchronization or even independently of the ordinary synchronization protocol. The process of maintaining an item even if outside of the replica's filter continues until the item reaches a reference replica. In this way, updates made that are outside the filter(s) in a hierarchical chain will still reach a reference replica (which has no items outside its filter).

In other implementations, a replica may send push-out notifications to any of the replica's ancestors. Alternatively, a replica may send push-out notifications to any replica that is closer to a reference replica, as indicated by comparing each replica's length of chain of parents, as maintained in a replica's hierarchical information. Note that when a replica receives a push-out notification, that replica receives responsibility for the item and guarantees that the item eventually reaches a reference replica.

A push-out notification may include the item being transferred. In some implementations, this is always the case. In alternative implementations, if the sending replica determines that the receiving replica already "stores" the item, the push-out notification may be abbreviated to include the identifier and version of the item being transferred and need not include the item itself. Preferably, the sending replica determines this by inspecting class I knowledge sent by the receiving replica during the normal synchronization protocol. Alternatively, the information could be sent in a separate protocol.

New and updated items are disseminated from a reference replica down the hierarchical topology as a result of synchronization operations occurring between parent replicas and their children in the hierarchy. For example, referring again to FIG. 5, at some time $t_3$, replica C requests a synchronization from its parent, reference replica A, following the synchronization operation described above. When a child replica synchronizes from an up to date reference replica, the knowledge in the child replica is updated to the knowledge of the reference replica. It may be that the child replica has more up to date information regarding one or more items. In this case, the knowledge fragments in the child replica are updated.

When synchronizing from reference replica A, replica A may send both class I and class II knowledge as learned knowledge. However, because replica C receives knowledge from reference replica A of all items (some of which may be within replica C's interest set and some of which may be outside replica C's interest set), there is no need to maintain class II knowledge as a separate knowledge fragment, and the learned knowledge received by replica C a single "star knowledge" fragment.

Subsequently, replica F may synchronize from replica C, in a manner described above, and thus, all knowledge that was known to the reference replica and fitting replica F's interest set may be learned by replica F. In general, the children replicas may synchronize from their parent replicas as described above until all knowledge from the reference replica is received in the bottom tier replicas. In this way, all updates made by any replicas are received in all other replicas having interest in those updates.

In accordance with some implementations, by defining a hierarchical topology of one or more children synchronizing with one or more parents, all items created by any replica in the collection will eventually be disseminated. Once the hierarchical relationships are defined, synchronization of the children to and from their parents may occur by ad-hoc synchronization, as described below. In the hierarchical topology, star knowledge reduces the number of item set knowledge fragments maintained by a replica because it subsumes other knowledge fragments. Any item set knowledge fragment in the replica's knowledge that is dominated by star knowledge is subsumed by the star knowledge and need not be maintained. Alternatively, all item set knowledge fragments in the replica's knowledge that are dominated by star knowledge can be combined into a single item-set knowledge fragment equal to the star knowledge. Thus, a replica can reduce the number of knowledge fragments as its star knowledge increases, and a replica may reduce its entire knowledge to a single star knowledge fragment.

According to implementations, full and partial replicas can converge to a state where they all have a single star knowledge fragment. In other words, once all replicas know of all updates, all replicas, both full and partial, should have the same compact knowledge. Assume the following conditions, which gradually will be relaxed:
1. A replica does not change its filter;
2. A replica never creates or updates an item so that the new version fails to match its filter;
3. A replica only synchronizes with its parent or child replicas;
4. A replica's parent does not change; and
5. A replica does not permanently fail, although it may be temporarily unavailable.

Under these conditions, any version produced by a replica will be either stored by the replica or overwritten by another version that may or may not be stored by the replica. A replica's knowledge is monotonically increasing and always includes all versions that it produced. When a replica generates a new version, it adds this to its own star knowledge.

When a parent synchronizes from a child replica, the child sends its knowledge as learned knowledge. This is because the parent, by construction, has a filter that is no more restrictive than the child's. Thus, after synchronizing from the child, the parent knows (and stores) everything that the child knows (and stores). When a child replica synchronizes from its parent, the parent also can send all of its knowledge (which should be star knowledge) as learned knowledge to the child. This is because each version known to the parent is either of interest to the child, in which case the child would have received it during this or a previous synchronization, or known to not be of interest to the child. Thus, given the assumptions stated above, each replica can pass its complete knowledge as learned knowledge for any synchronization operation and, as a consequence, each replica maintains a single star knowledge fragment.

Figure 6:
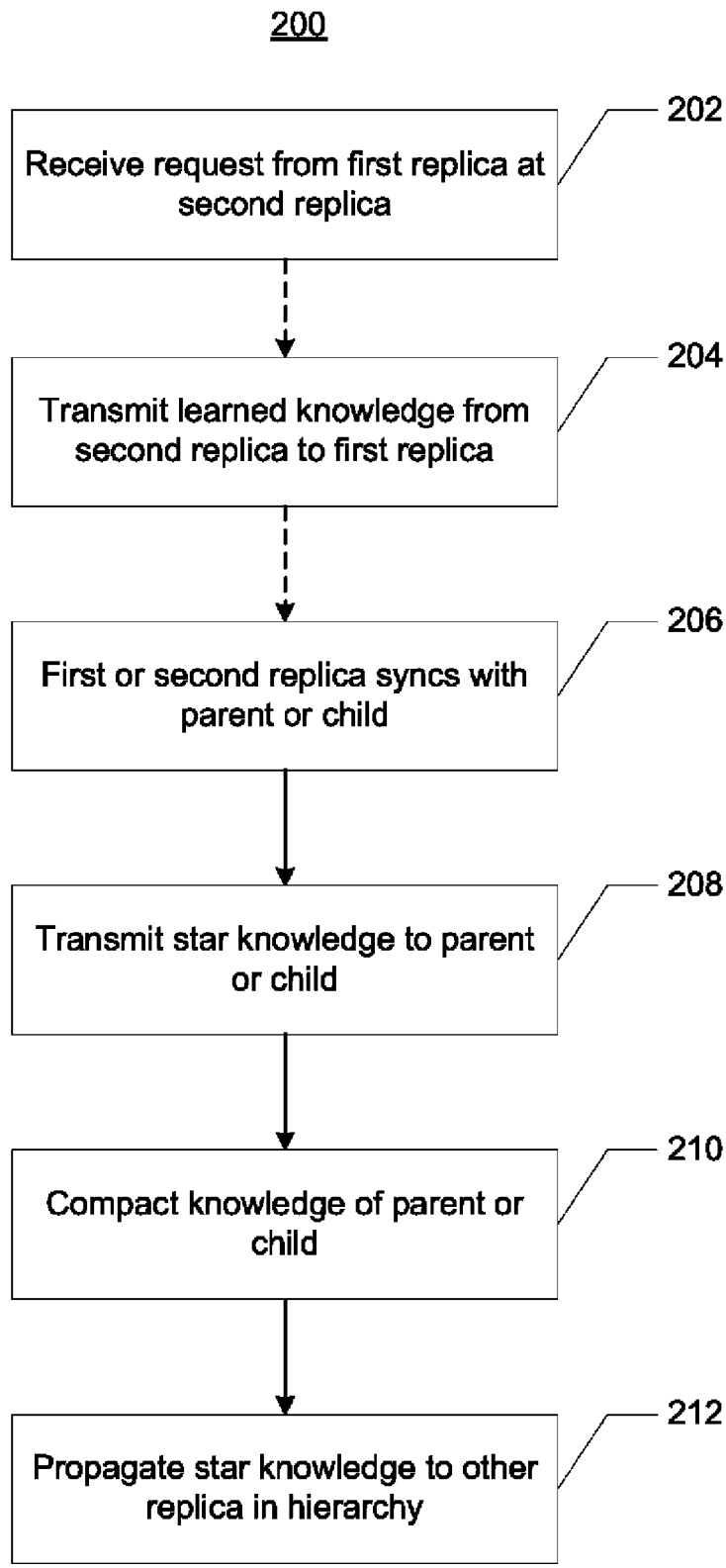
FIG. 6 illustrates an exemplary process for synchronizing a hierarchical topology of replicas to converge each replica's knowledge to a star knowledge fragment.

Now relax assumption 3. In some implementations, a replica may synchronize with ad hoc partners, that is, with replicas in addition to its parent and child replicas. FIG. 6 illustrates an exemplary process 200 for synchronizing a hierarchical topology of replicas to converge each replica's knowledge to a star knowledge fragment. At 202, a request is received at a second replica from a first replica. At 204, the learned knowledge is transmitted from the second replica to the first replica. When synchronizing with partners other than its parent or children, the second replica may send learned knowledge about the items that it stores but no star knowledge. At 206, the first or second replica then synchronizes with a parent or child. At 208, star knowledge is transmitted. Star knowledge propagates up the synchronization hierarchy when parents synchronize from their children and then back down the hierarchy when children synchronize from their parents. In the exemplary process 200, replicas do not change their filters, thus each replica's star knowledge is monotonically increasing. As long as parents and children occasionally synchronize in both directions, each replica will eventually receive star knowledge for all versions.

At 210, the knowledge fragment of the parent or child is compacted. A replica's star knowledge will eventually dominate any item-set knowledge fragments that it receives during ad-hoc synchronizations (e.g., synchronizations at 202 and 204), causing such non-star knowledge fragments to be discarded. At 212, the star knowledge propagates throughout the hierarchical topology. This will provide both full and partial replicas with star knowledge.

In another implementation, a replica may send its full knowledge as learned knowledge if it can determine that its filter is equal, less restrictive, or more restrictive than that of its synchronization partner. The filter may be determined at 204. This may speed up the rate at which replicas receive star knowledge at 212 since it allows such knowledge to flow over a wider variety of paths, and not just those defined by the synchronization hierarchy.

When synchronization takes place between replicas with incomparable filters, some star knowledge can still be sent as learned knowledge at 204. A replica's star knowledge includes an entry for itself that contains the latest version produced by this replica. A source replica S may return learned knowledge about all versions that it created. That is, the source can return as learned knowledge a knowledge fragment of the form *:<Sc> where c is the latest numbered update performed by the source, i.e., Sc is the latest version produced by this replica (the source replica's "self-star knowledge").

For any versions generated by the source replica that are in the source replica's data store, the source may determine whether the version is of interest to the target, and, in any case, can include the version in its reported learned knowledge. Any versions generated by the source that it does not store are obsolete, and hence are not of interest to the target. Thus, the source can send its self-star knowledge as learned knowledge in addition to whatever learned knowledge it would normally send at 204.

Similarly, a replica may send star knowledge for each of its descendents as learned knowledge at 208. In particular, a replica either stores any versions generated by any of its descendents or such versions are obsolete. This is because descendants have filters that are no less restrictive that the replica. As previously noted, sending each descendant's self-star knowledge may reduce the time required for propagating star knowledge to all replicas.

Now relax assumption 2. In some implementations, a replica may update an item producing a version that does not match its own filter (i.e., out-of-filter updates). That version is placed in the "push-out store" and will be sent to the replica's parent during the next synchronization from the replica to its parent. This does not affect the replica's own knowledge and the new version becomes part of the replica's class II knowledge. Nor does it affect the learned knowledge exchanged with parents or children. However, out-of-filter updates may affect synchronization with ad-hoc partners. Specifically, versions generated by a replica, but not in its data store, are not necessarily obsolete. These cannot be included in the learned knowledge sent to synchronization partners at 204 with incomparable or less restrictive filters since such partners may be interested in such versions.

Sending learned star knowledge to ad-hoc synchronization partners may be optional. In some implementations, a replica may not send such knowledge if it has performed any out-of-filter updates in the past and its synchronization partner may have an incomparable or less restrictive filter. Alternatively, a replica could maintain a record of the out-of-filter updates that it has performed, and perhaps those performed by its children, which it can determine since such updates are pushed out by its children. If the replica learns that one of its out-of-filter versions is obsolete, then this version can be removed from its list. The replica can then send learned star knowledge if all of its out-of-filter versions are already known to its synchronization partner.

Now relax assumption 1. In some implementations, a replica may change its filter. Such filter changes may be viewed as creating new replicas with immutable filters, i.e. creating a new replica ID when a replica modifies its filter. Each filter change would add a new replica to all knowledge vectors. Such an implementation may be used if filter changes do not occur often, or if replica creation is not expensive and the system can easily purge inactive replicas from knowledge vectors.

If a replica makes its filter more restrictive, then its knowledge does not change. However, items that matched its previous filter, but do not match the new filter, should be discarded from the replica's data store. If a discarded item has a version that was not generated by the local replica, then any updates performed by the replica to this item should be obsolete. If the version of a discarded item was generated by this replica, then the version should be treated as an out-of-filter update. The discarded version should be placed in the replica's push-out store, and the processes discussed above with regard to ad-hoc synchronization with out-of-filter updates may be used.

If a replica makes its filter less restrictive, then items that were previously uninteresting may now be of interest. Thus, the replica should discard knowledge for any items that it does not store, thereby turning its star knowledge into item-set knowledge. The replica cannot retain its (or its descendants') self-star knowledge since it (or one of its descendants) may have previously performed an out-of-filter update producing a version that matches its new filter. Assuming that this version is no longer in the replica's push-out store, the replica should receive it from some other replica. When the replica synchronizes from its parent, it will receive missing versions and all of its parent's star knowledge. The replica will eventually receive some self-star knowledge from its parent at 206 and 208, but the parent may be missing some versions that were generated by the replica, either because the parent has not yet received these or because the parent expanded its own filter causing it to discard its star knowledge.

An example illustrating the difficulty of accumulating star knowledge when filters change is as follows. Replica C updates item j producing version C4 which does not match C's filter. This version is pushed to replica C's parent, replica P, who also is not interested in this version. Replica P, in turn, pushes C4 to its parent, a reference replica. Later, replica P changes its filter so that version C4 of item j is now of interest. When replica P changes its filter, it discards the star knowledge that it has for C so that P no longer knows about C4. Thus, P will eventually receive C4 from another replica, such as its parent.

If replica C updated item m producing version C5 and then updated m again producing version C6, version C6 of item m does not match replica C's filter, and so is placed in C's push-out store. When replica P next synchronizes from C, it is sent version C6. However, replica C cannot send *:<C6> as its learned knowledge because this would cause other replicas to avoid sending C4 to replica P.

In the above scenario, if replica C simply sends m:<C6>, the other replicas need to determine that version C5 is obsolete and hence can be included in their star knowledge for replica C. This may be accomplished in some implementations by maintaining an "update history" containing recent versions that it has produced, as well as recent versions produced by any of its descendants. Each item in this history is marked as either current or obsolete. When synchronizing to its parent at 206, a replica sends items from its update history that have not already been sent to the parent at 208. Thus, a replica can clear its update history once it knows that the items have been received by its parent, i.e., once synchronization with the parent completes successfully. As such, the update history can be viewed as an update log containing version numbers and an associated obsolete bit. Similarly, when a replica synchronizes from one of its children at 206, it receives the child's update history at 208, which may include versions produced by other descendants. The child's update history is added to the parent replica's own update history.

A replica can use the update history to construct self-star knowledge for its descendants. Specifically, if a replica has *:<Ci> for some replica C and version Ci+1 is included in the replica's update history, then the replica can update its star knowledge for replica C to *:<Ci+1> as long as version Ci+1 is known to the replica or is marked as obsolete in the update history. Versions generated by a replica need not be sequentially numbered as long as the update history maintains an ordered list of versions. The root replica of the synchronization hierarchy will receive a complete update history for all items in the system, and thus can construct complete star knowledge. This star knowledge will then flow down the hierarchy as replicas synchronize from their parents.

In some implementations, storing and sending complete update histories may be avoided. As such, obsolete bits need not be explicitly maintained in the update history. Each version generated by a replica or one of its descendants may be either: (a) the latest version of an item in that replica's data store, (b) in the replica's push-out store, (c) obsolete, (d) already been sent to the replica's parent or (e) in the case of a descendant-generated version, not yet been received. Versions in category (e) will eventually move into one of the other categories. Versions in categories (a) and (b) may be sent to the replica's parent during synchronization. Versions in category (c) may be sent in the replica's update history. In any case, such versions (those in (a), (b), or (c)) can be added to the parent replica's star knowledge.

Versions in category (d) may no longer be in the parent replica's star knowledge, because the parent may have broadened its filter, causing it to discard its star knowledge. In this case, the replica will have "holes" in its star knowledge that prevent it from adding versions received from a child's update history. These versions will eventually propagate up to a reference replica at the root of the synchronization hierarchy that will be able to construct complete star knowledge.

In some implementations, a replica's update history is a range of versions that it has recently generated as well as a range of versions for each descendant. In these implementations, the complete update history need not be maintained, only the version range, thereby avoiding unbounded update histories. The update history may serve as star knowledge for a range of versions. When a replica synchronizes to its parent or other replicas, it passes as a new type of learned knowledge the range of versions produced by it and its descendants since its last synchronization with the parent.

Thus, a replica maintains authoritative star knowledge for itself and its descendants. For any version in a replica's authoritative star knowledge, the replica either stores the item with this version in its data store or push-out store, or knows that the version is obsolete. As such, a replica's authoritative star knowledge can include any versions generated by this replica or a descendant that have not been removed from its push-out store. If a replica discards its push-out store after synchronizing to its parent, then it may reset all of its authoritative star knowledge, and the next version that it generates starts a new version range. A replica may return its authoritative star knowledge as learned knowledge when synchronizing with any other replica. Parent replicas may retain authoritative star knowledge that they receive from their children and pass it up to their parents. The parent replica, or one of its ancestors, such as the root, and possibly other replicas can stitch together the version ranges in authoritative star knowledge fragments to construct a complete star knowledge.

When a replica changes its filter, it does not need to discard its update history or authoritative star knowledge. This is an aspect where authoritative star knowledge may differ from regular star knowledge. Versions may be recorded in the update history for an item that the replica currently stores, an item in its push-out store, or an obsolete version of such an item. Making a replica's filter more restrictive may cause items to move from its data store to its push-out store. Making a replica's filter less restrictive may cause items to move from its push-out store to its data store. In either case, the replica's knowledge retains all versions in its update history or authoritative star knowledge.

After synchronizing with its parent, a replica may discard its update history or version ranges provided it does not remove versions from its push-out store. The replica also may exchange its version history with ad-hoc synchronization partners. For example, if a replica's parent is unavailable for an extended period, it may be beneficial to send its update history to other replicas that can push it towards a reference replica. A replica may then discard versions from its update history that it discovers are known to the root.

Now relax assumption 4. In some implementations, replicas may change parents. This is acceptable because the root replica will eventually receive a complete update history or complete set of version ranges. When a replica changes its parent, the versions generated by the replica and/or its descendants simply take a different path to reach the root.

If a replica's child switches to a new parent and then switches back to this replica, using a version range scheme, the replica may end up with more than one version range for versions produced by this child and/or its descendants. In particular, the replica may end up with holes in its self-star knowledge for this child since it may not have received versions generated by the child during the period when it had a different parent. This, however, is only a temporary situation since these holes will eventually be filled in by star knowledge received directly or indirectly from a reference replica.

An exemplary scenario of the implementations described above is as follows. The system includes replicas C, P, D, and possibly other replicas. Replica C is P's child, where as replicas C and D are peers. Replica C may have other replicas as descendants. Replica C is a partial replica. Replica D is also a partial replica with a filter that is incomparable with replica C's. Initially, all of the replicas know about all updates. Each replica has knowledge *:<A5 C5 D5>.

First, replica C changes its filter to be more restrictive, i.e. items that previously matched C's filter set may no longer be of interest. When C changes its filter, it discards items from its data store that do not match its new filter. However, C does not need to update its knowledge since its knowledge about the discarded items becomes class II knowledge. $K_C$=*:<A5 C5 D5>.

Replica C then updates item m, producing version C6, which still matches C's filter. Since C did not previously have any authoritative star knowledge for itself, it starts a new version range that includes C6. Authoritative star knowledge is indicated by "**" along with a version range for a replica. $K_C$=*:<A5 C6 D5>+**:<C[6..6]>. Replica C next updates item j, producing version C7, which still matches C's filter. $K_C$=*:<A5 C7 D5>+**:<C[6..7]>.

Next, replica D synchronizes from replica C, receiving version C7 of item j but not version C6 of item m since C6 does not match D's filter. Replica D also receives learned knowledge of *:<C[6..7]>. $K_D$=*:<A5 C5 D5>+j:<A5 C7 D5>+*:<C[6..7]>=*:<A5 C7 D5>. Replica D then updates item j, producing version D6, which does not match C's filter. Since D did not previously have any authoritative star knowledge for itself, it starts a new version range that includes D6. $K_D$=*:<A5 C7 D6>+**:<D[6..6]>.

Thereafter, replica C synchronizes from replica D, receiving a move-out notification for version D6 of item j, and also receives learned knowledge *:<D[6..6]>. $K_C$=*:<A5 C7 D5>+**:<C[6..7]>+j:<A5 C7 D6>+*:<D[6..6]>=*:<A5 C7 D6>+**:<C[6..7]>. Replica P then synchronizes from replica D, receiving version D6 of item j, and also receives learned knowledge. $K_P$=*:<A5 C5 D5>+j:<A5 C7 D6>+*:<D[6..6]>=*:<A5 C5 D6>+j:<A5 C7 D6>. Here, replica P cannot fully compact its knowledge since it is unaware of version C6.

Replica C then changes its filter to be more restrictive, i.e. items that previously matched C's filter set may no longer be of interest. C's knowledge does not change. $K_C$=*:<A5 C7 D6>+:<C[6..7]>. Next, replica P synchronizes from replica C, receiving no new items, but does receive learned knowledge of :<C[6..7]>. $K_P$=*:<A5 C5 D6>+j:<A5 C7 D6>+**:<C[6..7]>=*:<A5 C7 D6>+**:<C[6..7]>. Optionally, replica C discards its authoritative star knowledge since this knowledge has been passed to its parent P. $K_C$=*:<A5 C7 D6>.

Another exemplary scenario of the implementations described above is as follows. The system includes replicas C, P, R, and possibly other replicas. Replica C is P's child, and P is R's child. Replica C may have other replicas as descendants. Replicas C and P are partial replicas. Replica R is a reference replica. Initially, all of the replicas know about all updates, and each replica has knowledge *:<A5 C3 D5>.

Replica C may update item j producing version C4 which does not match C's filter. This item is placed in C's push-out store. $K_C$=*:<A5 C4 D5>+**:<C[4..4]>. Replica C then synchronizes to its parent, replica P, and version C4 of item j is pushed to P, who also is not interested in this version. This item is placed in P's push-out store. $K_P$=*:<A5 C4 D5>+**:<C[4..4]>.

Next, version C4 is removed from replica C's push-out store, causing C to and replica C discards its authoritative knowledge of this version. $K_C$=*:<A5 C4 D5>. Replica P then synchronizes to its parent, replica R, and pushes C4 and learned knowledge **:<C[4..4]>. Replica R, as a reference replica, does not maintain explicit authoritative knowledge because all of its knowledge is authoritative. $K_R$=*:<A5 C4 D5>. Next, replica P removes C4 from its push-out store. $K_P$=*:<A5 C4 D5>. Replica P then broadens its filter so that version C4 of item j is now of interest. Replica P reduces its knowledge to those items in its data store. Replica P will eventually receive C4 from some other replica, such as its parent. Replica P stores items l, m, and n. $K_P$={l,m,n}: <A5 C4 D5>.

Replica C then updates item m producing version C5. $K_C$=*:<A5 C5 D5>+**:<C[5..5]>. Next, replica C updates item m again producing version C6, which does not match C's filter. Version C6 is placed in replica C's push-out store. $K_C$=*:<A5 C6 D5>+:<C[5..6]>. Replica C then synchronizes to replica P sending it version C6 of item m and learned knowledge of :<C[5..6]>. $K_P$={l,m,n}: <A5 C4 D5>+m:<A5 C6 D5>+:<C[5..6]>={l,n}: <A5 C4 D5>+m:<A5 C6 D5>+:<C[5..6]>. Replica P then synchronizes from replica R, receiving version C4 of item j and R's knowledge as learned knowledge. $K_P$={l,n}: <A5 C4 D5>+m:<A5 C6 D5>+**:<C[5..6]>+j:<A5 C4 D5>+*:<A5 C4 D5>=*:<A5 C6 D5>+**:<C[5..6]>.

Figure 7:
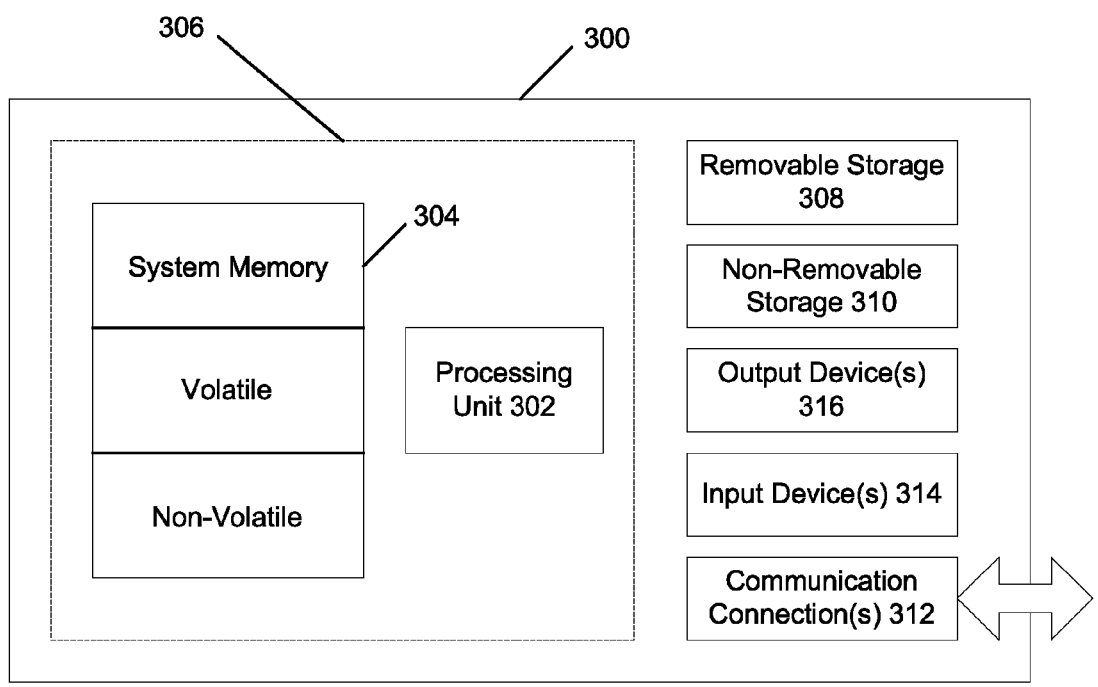
FIG. 7 is a block diagram of a computing system environment according to an implementation of the present system.

FIG. 7 shows an exemplary computing environment in which example implementations and aspects may be implemented. The computing system environment is only one example of a suitable computing environment and is not intended to suggest any limitation as to the scope of use or functionality.

Numerous other general purpose or special purpose computing system environments or configurations may be used. Examples of well known computing systems, environments, and/or configurations that may be suitable for use include, but are not limited to, personal computers (PCs), server computers, handheld or laptop devices, multiprocessor systems, microprocessor-based systems, network PCs, minicomputers, mainframe computers, embedded systems, distributed computing environments that include any of the above systems or devices, and the like.

Computer-executable instructions, such as program modules, being executed by a computer may be used. Generally, program modules include routines, programs, objects, components, data structures, etc. that perform particular tasks or implement particular abstract data types. Distributed computing environments may be used where tasks are performed by remote processing devices that are linked through a communications network or other data transmission medium. In a distributed computing environment, program modules and other data may be located in both local and remote computer storage media including memory storage devices.

With reference to FIG. 7, an exemplary system for implementing aspects described herein includes a computing device, such as computing device 300. In its most basic configuration, computing device 300 typically includes at least one processing unit 302 and memory 304. Depending on the exact configuration and type of computing device, memory 304 may be volatile (such as RAM), non-volatile (such as read-only memory (ROM), flash memory, etc.), or some combination of the two. This most basic configuration is illustrated in FIG. 7 by dashed line 306.

Computing device 300 may have additional features/functionality. For example, computing device 300 may include additional storage (removable and/or non-removable) including, but not limited to, magnetic or optical disks or tape. Such additional storage is illustrated in FIG. 7 by removable storage 308 and non-removable storage 310. Computing device 300 typically includes a variety of computer readable media. Computer readable media can be any available media that can be accessed by device 300 and include both volatile and non-volatile media, and removable and non-removable media.

Computer storage media include volatile and non-volatile, and removable and non-removable media implemented in any method or technology for storage of information such as computer readable instructions, data structures, program modules or other data. Memory 304, removable storage 308, and non-removable storage 310 are all examples of computer storage media. Computer storage media include, but are not limited to, RAM, ROM, electrically erasable program read-only memory (EEPROM), flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 300. Any such computer storage media may be part of computing device 300.

Computing device 300 may contain communications connection(s) 312 that allow the device to communicate with other devices. Computing device 300 may also have input device(s) 314 such as a keyboard, mouse, pen, voice input device, touch input device, etc. Output device(s) 316 such as a display, speakers, printer, etc. may also be included. All these devices are well known in the art and need not be discussed at length here.

It should be understood that the various techniques described herein may be implemented in connection with hardware or software or, where appropriate, with a combination of both. Thus, the processes and apparatus of the presently disclosed subject matter, or certain aspects or portions thereof, may take the form of program code (i.e., instructions) embodied in tangible media, such as floppy diskettes, CD-ROMs, hard drives, or any other machine-readable storage medium where, when the program code is loaded into and executed by a machine, such as a computer, the machine becomes an apparatus for practicing the presently disclosed subject matter.

Although exemplary implementations may refer to utilizing aspects of the presently disclosed subject matter in the context of one or more stand-alone computer systems, the subject matter is not so limited, but rather may be implemented in connection with any computing environment, such as a network or distributed computing environment. Still further, aspects of the presently disclosed subject matter may be implemented in or across a plurality of processing chips or devices, and storage may similarly be affected across a plurality of devices. Such devices might include PCs, network servers, and handheld devices, for example. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed:

1. A method of synchronizing replicas in a system in which a collection of items are replicated fully or partially at two or more replicas, comprising:

arranging the replicas into a tree having a predefined synchronization hierarchy among the replicas;

recording item-set knowledge of which each replica is aware at each replica;

maintaining hierarchical information at each replica in the predefined synchronization hierarchy, wherein the hierarchical information maintained by at least one replica identifies a parent replica and a child replica of the at least one replica;

sending the item-set knowledge from a target replica to a source replica;

receiving, at the target replica, items that are previously unknown by the target replica and learned knowledge from the source replica, wherein the items that are previously unknown include items that are outside of an interest set of the source replica, and wherein the interest set comprises items that satisfy a filter;

assuming authority for the items that are outside of the interest set of the source replica by the target replica;

discarding the items that are outside of the interest set by the source replica after the target replica assumes authority for the items;

adding the items that are unknown by the target replica, and the learned knowledge to the target replica's item-set knowledge;

informing the target replica of versions of items for which the source replica is authoritative;

constructing star knowledge at the target replica from authoritative information from the source replica, wherein the star knowledge is a knowledge fragment that refers to a set of all items in the system;

combining star knowledge from source replicas into a star knowledge fragment with a knowledge vector containing an entry for all replicas;

reducing the overall size of the target replica's knowledge by discarding knowledge fragments that are covered by the star knowledge fragment;

creating a full replica at a root of the tree by providing the star knowledge fragment at the root of the tree in accordance with the hierarchical information; and propagating the full replica to the predefined synchronization hierarchy in accordance with the hierarchical information maintained at each replica.

2. The method of claim 1, further comprising:
a replica being authoritative for the versions that it creates.

3. The method of claim 1, further comprising:
maintaining metadata at each replica to record a set of versions for which a replica is authoritative.

4. The method of claim 3, further comprising:
maintaining the authoritative metadata as explicit version sets, an update history, star knowledge, or a version range.

5. The method of claim 1, further comprising:
reducing the target replica's knowledge to a single star knowledge fragment.

6. The method of claim 1, further comprising:
assuming authority for the versions at a parent replica for child replicas of the parent replica.

7. The method of claim 6, further comprising:
relinquishing authority at child replicas for the versions passed to the parent replica.

8. The method of claim 7, further comprising:
passing star knowledge from the parent replica to the child replicas during synchronization.

9. The method of claim 8, further comprising:
maintaining version ranges at the child replicas containing versions of items produced by the child replicas or their descendants; and clearing an update history when the child replicas synchronize with the parent replica.

10. The method of claim 1, further comprising:
synchronizing the replicas in an ad-hoc fashion where no hierarchical relationship is established between the target replica and the source replica.

* * * * *